(12) United States Patent
Browning et al.

(10) Patent No.: US 8,346,637 B2
(45) Date of Patent: Jan. 1, 2013

(54) SYSTEM AND METHOD FOR PROVIDING RECOVERY FOR VICTIMS OF CHECK FRAUD

(75) Inventors: John Browning, Fallston, MD (US); Ken Illingworth, Abingdon, MD (US); Brian Briggs, Forest Hill, MD (US)

(73) Assignee: Ezshield, Inc., Palo Alto, CA (US)

( * ) Notice: Subject to any disclaimer, the term of this patent is extended or adjusted under 35 U.S.C. 154(b) by 1268 days.

(21) Appl. No.: 10/685,206

(22) Filed: Oct. 14, 2003

(65) Prior Publication Data

US 2004/0083140 A1      Apr. 29, 2004

Related U.S. Application Data

(60) Provisional application No. 60/418,936, filed on Oct. 15, 2002.

(51) Int. Cl.
*G06Q 40/00*      (2012.01)
(52) U.S. Cl. ............................................ 705/35; 705/44
(58) Field of Classification Search .................... 705/35, 705/44
See application file for complete search history.

(56) References Cited

U.S. PATENT DOCUMENTS

| | | | | |
|---|---|---|---|---|
| 4,634,148 A | | 1/1987 | Greene | 283/70 |
| 5,093,787 A | * | 3/1992 | Simmons | 705/33 |
| 5,267,753 A | * | 12/1993 | Chock | 283/54 |
| 5,326,136 A | * | 7/1994 | Doyle | 283/58 |
| 5,940,844 A | * | 8/1999 | Cahill et al. | 715/268 |
| 6,073,121 A | * | 6/2000 | Ramzy | 705/45 |
| 6,086,708 A | | 7/2000 | Colgate, Jr. | 156/277 |
| 6,390,362 B1 | * | 5/2002 | Martin | 235/379 |
| 6,766,301 B1 | * | 7/2004 | Daniel et al. | 705/14.26 |
| 6,978,927 B2 | * | 12/2005 | Latimer et al. | 235/380 |
| 7,040,539 B1 | | 5/2006 | Stover | |
| 7,263,506 B2 | * | 8/2007 | Lee et al. | 705/38 |
| 7,366,339 B2 | * | 4/2008 | Douglas et al. | 382/137 |
| 2002/0032648 A1 | * | 3/2002 | Pine et al. | 705/39 |
| 2002/0184152 A1 | * | 12/2002 | Martin | 705/45 |
| 2004/0010466 A1 | * | 1/2004 | Anderson | 705/45 |
| 2006/0145469 A1 | | 7/2006 | Lubrino et al. | |
| 2011/0307275 A1 | * | 12/2011 | Subin et al. | 705/3 |
| 2012/0109691 A1 | | 5/2012 | Thomas et al. | |
| 2012/0109854 A1 | | 5/2012 | Thomas et al. | |

OTHER PUBLICATIONS

Paymaster Technologies, Inc., Testimonials, Jul. 28, 2001. http://web.archive.org/web/20010728131650/http://www.paymastertech.com/test.html.*
Bad-check writer gets 8-year term Still has to face charges in 4 more counties, 2 states:[Final Edition], Ryan Werbeck The Journal Gazette. Journal—Gazette. Ft. Wayne, Ind.:Oct 30, 2001. p. 1A.*

(Continued)

*Primary Examiner* — Thomas Dixon
*Assistant Examiner* — Benjamin S Fields
(74) *Attorney, Agent, or Firm* — Nixon Peabody LLP; John P. Schaub

(57) ABSTRACT

A method for a consumer to protect against loss associated with specified forms of check fraud. Upon purchasing checks, a consumer can subscribe to a check fraud protection program, for an additional fee. The subscription will enable the consumer to obtain reimbursement from the check printer for the consumer's losses due to specified causes. The consumer reciprocally assigns any right of recovery from the consumer's bank or financial institution to the check printer, which can then seek reimbursement from the bank, or financial institution and institute proceedings against the fraud perpetrator. Protection may be obtained for forged signatures, forged endorsements and altered check. A symbol to indicate such protection is also disclosed.

10 Claims, 5 Drawing Sheets

OTHER PUBLICATIONS

Enforcement of new law boosts bad-check recoveries, Arizona Daily Star. Tucson, Ariz.:Nov 5, 1995. p. 3B.*

Forum tackles issue of identity theft; Guard your numbers and check your statements, experts warn, David Rumbach. South Bend Tribune. South Bend, Ind.:Jul. 26, 2002. p. 1.*

Gallagher, "St. Louis Post-Dispatch Personal Finance Column", St. Louis Post-Dispatch, Jul. 20, 1996.*

Office Action in U.S. Appl. No. 11/328,362, mailed Oct. 4, 2012.

* cited by examiner

EZSHIELD CHECK FRAUD PROTECTION PROGRAM[sm](patent pending)
REIMBURSEMENT REQUEST FORM

Please complete the following form completely and return with all requested attachments to the address set forth below. If there are multiple account holders, each account holder must be listed and must sign the forms below.

Name(s): _____
Address: _____
Daytime Phone: _____
Home Phone: _____
E-Mail Address: _____
Describe nature of fraud: _____
_____
_____

Date Loss Incurred: _____
Date Loss Discovered: _____
Involved Check Number(s): _____
Has the bank been contacted? ❏ Yes ❏ No
Has a police report been prepared? ❏ Yes ❏ No
Please attach a copy and/or provide the police report number: _____
Location of loss: _____
Did the loss involve a family member? ❏ Yes ❏ No
Did the loss involve a resident of your household? ❏ Yes ❏ No
Describe damages claimed: _____
_____
_____

UNDER THE PENALTIES OF PERJURY THE ABOVE INFORMATION IS TRUE AND CORRECT TO THE BEST OF MY AND/OR OUR KNOWLEDGE AND BELIEF.

_____
Signature

_____
Name Printed

_____
Signature

_____
Name Printed

Please complete the attached Limited Durable Power of Attorney form and attach any and all documents related to the loss, including the original check upon which the claim is based, police reports or any other documentation related to the loss.

Fig. 3

LIMITED DURABLE POWER F ATTORNEY FORM

NOTICE: READ OVER THE FOLLOWING DOCUMENT CAREFULLY. LEGAL POWERS ARE GRANTED BY THIS DOCUMENT. IF THERE IS ANYTHING YOU DO NOT UNDERSTAND OR IF YOU HAVE QUESTIONS ABOUT THIS DOCUMENT, YOU SHOULD ASK A LAWYER TO EXPLAIN IT TO YOU. YOU MAY REVOKE THIS LIMITED DURABLE POWER OF ATTORNEY IF YOU LATER WISH TO DO SO.

I, _____ [name], of _____ [street address] _____ [city] _____ [county] _____ [state], being of sound mind, do hereby voluntarily appoint CUSTOM DIRECT, INC., a corporation duly incorporated in the State of Delaware, with the business address of 1802 Fashion Court, Joppa, Harford County, Maryland, as my true and lawful attorney-in-fact, for me and in my name, place and stead, and for my use and benefit to, in its sole discretion, transact, handle and dispose of the following limited matters: to demand, sue for, recover, collect, and receive all sums of money, debts, accounts and demands that are now or shall hereafter become due, owing, payable, or belonging to me and have, use, and take all lawful means for the recovery thereof, and to compromise and give discharges for the same limited to the fraud related to my bank account with _____ (hereinafter referred to as "my Bank") and more specifically, check number(s) _____ written on bank account number _____ (hereinafter referred to as "the Fraud").

I understand that my attorney-in-fact and my Bank may rely on this Limited Durable Power of Attorney. I understand that revocation of this Limited Durable Power of Attorney will not be effective until my attorney-in-fact and my Bank learn of my revocation. I agree to indemnify my Bank for any claims that arise out of its reliance on this Limited Durable Power of Attorney.

I hereby give and grant unto said attorney-in-fact limited power and authority to do and perform every act and thing necessary, to be done in and about relative to the Fraud as fully as I might or could do if personally present. All power and authority granted herein shall not be affected by my later disability, incapacity, adjudged incompetency or passage of time, except as otherwise provided by statute. This Limited Durable Power of Attorney shall be nondelegable and shall be exercisable and valid for as long as and until the earlier of when the Fraud is resolved or when this Limited Durable Power of Attorney is revoked. This Limited Durable Power of Attorney shall be effective immediately and shall continue until the earlier of when the Fraud is resolved or when this Limited Durable Power of Attorney is specifically revoked. I declare any act or thing lawfully done by my attorney-in-fact by virtue of this Limited Durable Power of Attorney shall be binding on myself, my heirs, my legal and personal representatives and my assigns.

NOTICE TO THIRD PARTIES

A third party who relies on the reasonable representations of my attorney-in-fact as to a matter relating to a power granted by this executed Limited Durable Power of Attorney will not incur any liability to me or to my heirs, assigns or estate as a result of permitting the attorney-in-fact to exercise the authority granted by this Limited Durable Power of Attorney. A third party who fails to honor this executed Limited Durable Power of Attorney may be liable to me, my attorney-in-fact, my heirs, assigns or estate for a civil penalty, plus damages, costs and fees associated with the failure to comply with this Limited Durable Power of Attorney.

SUBROGATION AND ASSIGNMENT

In further consideration of this Limited Durable Power of Attorney, I hereby agree to assign any and all claims that I have of any kind against any and all parties who may be responsible for the Fraud. I further agree to cooperate in any manner deemed necessary in any efforts to recover any amounts paid to me by Custom Direct, Inc. from third parties who may be responsible for damages or losses related to the Fraud. I specifically agree to provide any requested documentation to Custom Direct, Inc. and to cooperate in regard to any court proceeding or other action seeking to recover amounts paid and further to take no action to any way diminish, release or waive any claims against any party.

Fig. 4a

(LIMITED DURABLE POWER OF ATTORNEY - Page 2)

WARNING! THIS IS AN IMPORTANT LEGAL DOCUMENT. DO NOT SIGN THIS DOCUMENT UNLESS YOU FULLY UNDERSTAND THE CONSEQUENCES OF HAVING A LIMITED DURABLE POWER OF ATTORNEY.

I/we, as the principal(s), sign my/our name(s) to this Limited Durable Power of Attorney this ____ day of _____, 20___ and, being first duly sworn, do declare to the undersigned authority that I/we sign and execute this instrument as my/our Limited Durable Power of Attorney and that I/we sign it willingly, that I/we execute it as my/our free and voluntary act for the limited purpose expressed in this Limited Durable Power of Attorney and that I/we am/are eighteen years of age or older, of sound mind and under no constraint or undue influence.

_____                    _____
Signature of Principal                                               Social Security Number of Principal _____                    _____
Signature of Joint Principal                                       Social Security Number of Joint Principal WE SIGN BELOW AS WITNESSES. WE ARE NOT RELATED TO THE PRINCIPAL(S) BY BLOOD, MARRIAGE OR ADOPTION. THIS DECLARATION WAS SIGNED IN OUR PRESENCE. THE GRANTOR(S) APPEAR(S) TO BE OF SOUND MIND AND TO BE MAKING THIS DESIGNATION VOLUNTARILY, WITHOUT DURESS, FRAUD OR UNDUE INFLUENCE. NEITHER OF US IS AN ATTORNEY-IN-FACT NAMED IN THE DOCUMENT.

_____                    _____
Name of First Witness (PRINT)                                 Signature of First Witness (SIGN)

_____                    _____
Name of Second Witness (PRINT)                              Signature of Second Witness (SIGN)

ACKNOWLEDGMENT

State of _____

City/County of _____

Before me, a notary public in and for said City/County and State, personally appeared the above-named who acknowledged that he/she/they did sign the foregoing instrument and that the same is his/her/their free and voluntary act and deed.

In testimony whereof, I have hereunto set my hand and official seal this _____ day of _____, 20___.

_____
Notary Public

Commission No: _____

My Commission Expires: _____

Please send the Claim Form and Limited Durable Power of Attorney with all documents related to the claim to:
    EZShield™ Check Fraud Protection Program
    Attn: Risk Management Department
    1802 Fashion Court
    Joppa, Maryland 21085

Fig. 4b

SYSTEM AND METHOD FOR PROVIDING RECOVERY FOR VICTIMS OF CHECK FRAUD

CROSS REFERENCE TO RELATED APPLICATION

This application is based upon and claims benefit of copending and co-owned U.S. Provisional Patent Application Serial No. 60/418,936 entitled "System and Method for Providing Check Fraud Protection", filed with the U.S. Patent and Trademark Office on Oct. 15, 2002 by the inventors herein, the specification of which is incorporated herein by reference.

BACKGROUND OF THE INVENTION

1. Field of the Invention

The invention disclosed herein relates generally to the recovery of losses associated with unauthorized use of negotiable instruments, and more particularly to a fraud protection system and method for enabling a consumer to recover losses due to forged signatures, forged endorsements, or altered information on personal checks.

2. Background of the Prior Art

Attempted check fraud at commercial banks is a growing problem. Check fraud can be one of the most damaging personal frauds. A victim of check fraud can suffer not only loss of all their financial holdings, but damage to their credit report as well.

Check fraud is generally perpetrated in one of several manners, such as:

FORGED SIGNATURES—legitimate blank checks with an imitation of the payer signature;

FORGED ENDORSEMENTS—often involves the use of a stolen check, which is then endorsed and cashed or deposited by someone other than the payee;

COUNTERFEIT CHECKS—due to the advancement in color copying and desktop publishing capabilities, this is the fastest-growing source of fraudulent checks today;

ALTERED CHECKS—information on a legitimate check, such as payee or check amount, changed to benefit the perpetrator; and CHECK KITING—the process of depositing a check from one bank account into a second bank account without the sufficient funds to cover it.

According to a leading accounting firm, more than 500 million checks are forged annually, with losses totaling more than $10 billion.

According to the National Check Fraud Center, check fraud and counterfeiting are among the fastest-growing problems affecting the nation's financial system, producing estimated annual losses of $10 billion, and continues to rise annually at an alarming rate.

According to a report issued by the American Banker, an industry bankers' magazine, estimates of losses from check fraud will grow by 2.5% annually in the coming years.

Many processes and techniques have been developed to thwart the growing problem of check fraud. Special inks, microprinting, encryption of machine-readable code, and specially designed checkbooks to disclose loss of checks are some methods suggested to guard against check fraud. Even with the multitude of schemes to prevent incidents of check fraud, the continued growth indicates that most courses of action are ineffective in preventing such occurrence, such that consumers continue to lose significant funds through the ongoing check fraud ailment. Efforts must be directed to recovery of losses attributed to such check fraud.

Ordinarily, for a consumer to recover losses arising from victimization by check fraud, such consumer must generally investigate the fraud on their own, report such fraud to their bank or financial institution to seek reimbursement, and initiate criminal and/or civil proceedings as appropriate, if necessary. Such steps are generally unfamiliar to the average consumer, and the apprehension of such tasks can present a barrier to entry.

Accordingly, there has been found to remain a need for a simple method for a consumer victimized by check fraud to recover from losses associated with specific forms of check fraud, such as forged signatures, forged endorsements, and alterations to legitimate checks.

SUMMARY OF THE INVENTION

It is, therefore, an object of the present invention to enable a process for recovering losses due to check fraud that avoids the disadvantages of the prior art.

It is another object of the present invention to enable a method by which a consumer can recover losses due to specific modes of check fraud. A related object is to enable a method by which a consumer can recover losses directly from such consumer's check printer.

It is another object of the present invention to enable a method by which a consumer can recover losses due to check fraud in the nature of forged signatures. It is another object of the present invention to enable a method by which a consumer can recover losses due to check fraud in the nature of forged endorsements. It is yet another object of the present invention to enable a method by which a consumer can recover losses due to check fraud in the nature of altered instruments.

Another object of the present invention is the provision of a claim form for reporting loss to the consumer's check printer.

Another object of the present invention is the provision of limited durable power of attorney by which a consumer can assign any claim arising from the check fraud to the check printer.

Another object of the present invention is the provision of a novel method for recovering losses arising from specific modes of check fraud.

A specific object of the invention is the provision of a negotiable instrument wherein a designated symbol is imprinted on the instrument to indicate the protection for that instrument.

Another object of the invention is to enable a method in which, upon occurrence and reporting of a check fraud event involving a protected check, a new series of protected checks is issued to the authorized check writer.

In accordance with the above objects, a system and method for a consumer to protect against loss associated with specified forms of check fraud are provided. Upon purchasing checks, a consumer can, for an additional fee, subscribe to a check fraud protection program. The subscription will enable the consumer to obtain reimbursement from the check printer for the consumer's losses due to predetermined causes of check fraud. The consumer reciprocally assigns any right of recovery from the consumer's bank or financial institution to the check printer, which can then seek reimbursement from the bank, or financial institution and institute proceedings against the fraud perpetrator.

BRIEF DESCRIPTION OF THE DRAWINGS

The above and other features, aspects, and advantages of the present invention are considered in more detail, in relation to the following description of embodiments thereof shown in the accompanying drawings, in which:

FIG. 3 is a claim form for use in a preferred embodiment of the present invention.

FIGS. 4a and 4b is a durable power of attorney for use in a preferred embodiment of the present invention.

DETAILED DESCRIPTION OF THE INVENTION

The invention summarized above may be better understood by referring to the following description, which should be read in conjunction with the accompanying drawings in which like reference numbers are used for like parts. This description of an embodiment, set out below to enable one to practice an implementation of the invention, is not intended to limit the preferred embodiment, but to serve as a particular example thereof. Those skilled in the art should appreciate that they may readily use the conception and specific embodiments disclosed as a basis for modifying or designing other methods and systems for carrying out the same purposes of the present invention. Those skilled in the art should also realize that such equivalent assemblies do not depart from the spirit and scope of the invention in its broadest form.

Figure 1:
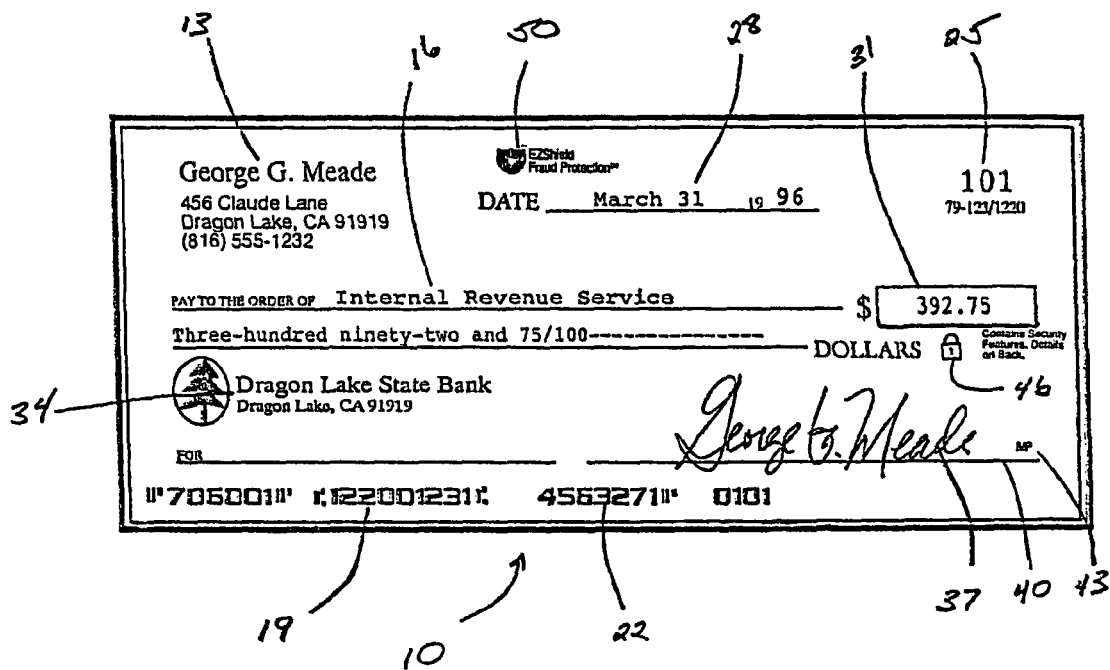
FIG. 1 is an illustration of a check for describing features of the present invention.

FIG. 1 shows a view of the face of a prepared check, indicated generally as 10. On the face of the check are the following data items: the name and address of the account holder 13; the name of the payee 16; the issuing bank number with routing number 19; the checking account number 22; a check number 25; the check date 28; the check amount 31; the name of the issuing bank 34; and the signature of the payer 37.

Indication of some security features may also be seen on the face of the check 10. For example, it is common to use microprinting to create the signature line 40. Such microprinting appears as a dotted line when photocopied. The stylized MP symbol 43 indicates the presence of microprinting. The padlock symbol 46 is a certification mark indicating that the check 10 contains certain security features.

Pursuant to one feature of a preferred embodiment of the instant invention, additional indicia 50 is provided on the face of the check indicating that the particular check 10 is protected by a check fraud protection program as disclosed herein. As explained in greater detail below, while a series of checks 10 having consecutive check numbers is issued to an account holder, it is intended that all checks in such series according to the instant invention bear such indicia 50, and thus that the check fraud protection program disclosed herein applies check fraud protection to every one of the checks in such series.

Figure 2:
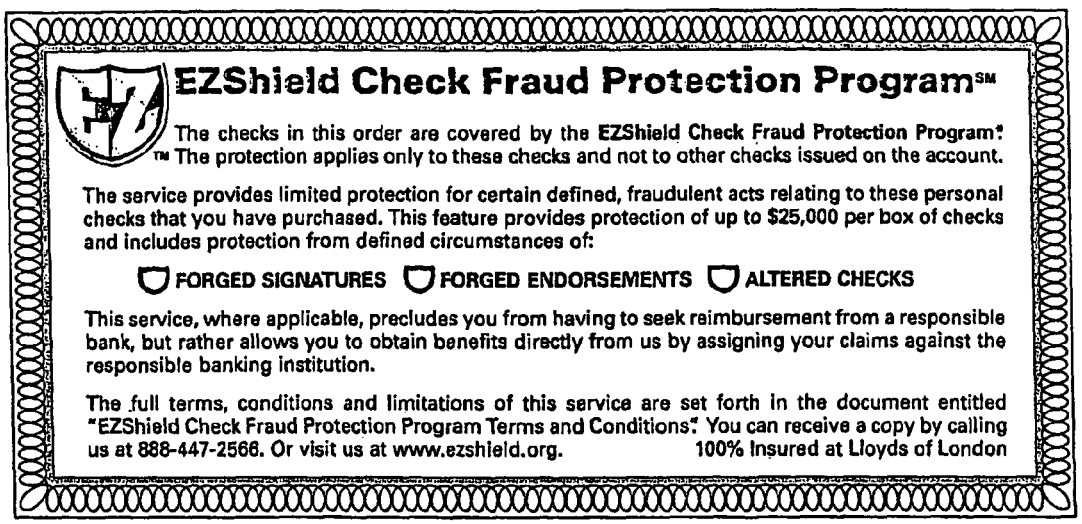
FIG. 2 is an illustration of an insert accompanying checks purchased under an embodiment of the present invention.

In operation, the system of the present invention operates as follows:

a. A consumer orders a box of checks from a check printing source and provides to the check printer the appropriate information to be printed on the check, such as the name and address of the account holder 13; the issuing bank number with routing number 19; the name of the issuing bank 34 and checking account number 22; and a beginning check number 25 for the box of checks.

b. During the ordering process, the consumer is presented the option of subscribing to a check fraud protection program for all the checks in the box.

c. Upon election by the consumer to purchase such check fraud protection, the check printer adds an indicia, such as 50 to every check printed in the box. The check printer also records the range of numbers of the checks in the box. Typically, a box contains two hundred (200) checks in single format or one hundred fifty (150) checks in duplicate format. The check printer sends the box of printed checks to the consumer and includes an insert, such as illustrated in FIG. 2, informing the consumer that the checks in the box are included under the check fraud protection plan.

d. Upon the occurrence of an identified check fraud event (as described in greater detail below) against any of the checks in the box, the consumer reports the occurrence to the check printer using a reimbursement request form to obtain reimbursement directly from the check printer. An exemplary reimbursement request form is illustrated in FIG. 3. The consumer also provides the check printer a power of attorney, including an assignment of the right of recovery by the consumer, to enable the check printer to pursue an appropriate action against the responsible banking or financial institution. An exemplary power of attorney form is illustrated in FIG. 4. In addition to such reimbursement request form, a police report and/or other proof of fraud is required.

e. Upon notification of such reimbursement request, the check printer prints a new box of checks which, when properly executed by the authorized account holder, will draw funds from a new account that receives the account holder's funds after the original, compromised account is closed.

Check fraud events for which reimbursement may be requested preferably include:

Forged Signatures: protection applies to legitimate blank checks that are forged with an authorized signature 37 (FIG. 1), as the payer, and that results in a debit to the checking account.

Forged Endorsements: protection applies to a legitimate check that is endorsed and cashed or deposited by someone other than the designated payee 16 (FIG. 1) based upon a fraudulent and false endorsement. Such protection, however, does not apply to a check that bears a legitimate original endorsement that is secondarily fraudulently endorsed.

Altered Checks: protection applies to legitimate checks that contain altered information such as payee identification 16, check amount 31, or other alteration to benefit the party altering the check.

Checks employed by the system and method of the invention described herein preferably only include those checks within the range of numbers purchased in the order at the time of the check fraud protection subscription. Such checks should be imprinted with indicia 50 indicating that the checks are, in fact, secured by the check fraud protection program disclosed herein. The check fraud protection program may only be purchased at the time the original checks are purchased. For accuracy, the check printer maintains a database record of all check numbers for which the check fraud protection program has been purchased. In order to be effective, the consumer must subscribe all the boxes of checks in a particular order. Protection expires once all checks in the box have been used or two years from the time of purchase, whichever is sooner.

The check fraud protection program described herein is not an insurance policy although a commercial insurance provider may insure the organization providing such fraud protection. The fraud protection program is designed to facilitate the consumer's recovery of losses arising from identified check fraud events, such that the consumer obtains benefits directly from the check printer by assigning any claims against the responsible banking/financial institution to the check printer. Accordingly, the consumer obtaining such fraud protection need not and should not seek any reimbursement from the responsible banking/financial institution.

The protection may be limited, such as to a maximum of $25,000.00 per box of checks, regardless of the number of checks for which reimbursement requests are presented and/or the number of requests made. Protection may apply only to personal checks purchased according to the program. Such protection does not apply to business checks, deposit tickets, and checks not included in a box of checks for which a subscription was purchased, even if such checks were also purchased from the same check printer. Furthermore, protection may be limited to only frauds committed in the country where the consumer is a resident.

Only designated losses are reimbursable pursuant to the check fraud protection program. The amount reimbursable includes all actual amounts paid from the consumer's account and all bank/financial institution/retailer fees arising from the fraud, not to exceed the limits of such check fraud protection program.

The invention has been described with references to a preferred embodiment. While specific values, relationships, materials and steps have been set forth for purposes of describing concepts of the invention, it will be appreciated by persons skilled in the art that numerous variations and/or modifications may be made to the invention as shown in the specific embodiments without departing from the spirit or scope of the basic concepts and operating principles of the invention as broadly described. It should be recognized that, in the light of the above teachings, those skilled in the art can modify those specifics without departing from the invention taught herein. Having now fully set forth the preferred embodiments and certain modifications of the concept underlying the present invention, various other embodiments as well as certain variations and modifications of the embodiments herein shown and described will obviously occur to those skilled in the art upon becoming familiar with such underlying concept. It is intended to include all such modifications, alternatives and other embodiments insofar as they come within the scope of the appended claims or equivalents thereof. It should be understood, therefore, that the invention may be practiced otherwise than as specifically set forth herein. Consequently, the present embodiments are to be considered in all respects as illustrative and not restrictive.

What is claimed is:

1. A computer implemented method for providing recovery for consumer victims of check fraud, comprising:
   by a system having a database, receiving from said consumer an order for printing a series of checks for a checking account, wherein the order includes an order for check fraud protection;
   printing checks according to the order;
   recording in a record of the database, a range of numbers of the checks in such order;
   receiving from the consumer a notification of an occurrence of check fraud against a check within the range of numbers of the checks in such order;
   receiving from the consumer a written limited power of attorney authorizing collection of an amount of money fraudulently obtained from the checking account because of the check fraud against the check within the range of numbers of the checks in the order; and
   issuing a reimbursement to the consumer the amount of money fraudulently obtained from the checking account and fees arising from the check fraud.

2. The method of claim 1, wherein the check fraud is selected from the group consisting of:
   legitimate blank check that is forged with an authorized signature;
   legitimate check that is endorsed and presented by other than a designated payee based upon a fraudulent endorsement; and
   legitimate check that is altered to benefit an altering party.

3. The method of claim 1, wherein the printing checks further comprises printing indicia upon each check to signify a check fraud protection program.

4. The method of claim 1, wherein the receiving notification of the occurrence of check fraud further comprises receiving documented proof of the check fraud.

5. The method of claim 4, wherein the documented proof of the check fraud comprises a police report.

6. The method of claim 1, wherein the receiving the written limited power of attorney further comprises receiving an assignment of a right of recovery by the consumer.

7. The method of claim 1, further comprising:
   upon receiving notification of the check fraud, printing a new series of checks for a new checking account that receives the consumer's funds after an original, compromised checking account is closed.

8. The method of claim 1, wherein the consumer's checking account comprises a personal checking account.

9. The method of claim 1, further comprising:
   receiving, from the consumer, an assignment of a right of recovery against a financial institution upon which the check is drawn.

10. The method of claim 9, wherein the written limited power of attorney and the assignment assign rights to a check printer, the method further comprising:
   using the written limited power of attorney to pursue recovery from the financial institution for the check printer.

* * * * *